UNITED STATES PATENT OFFICE.

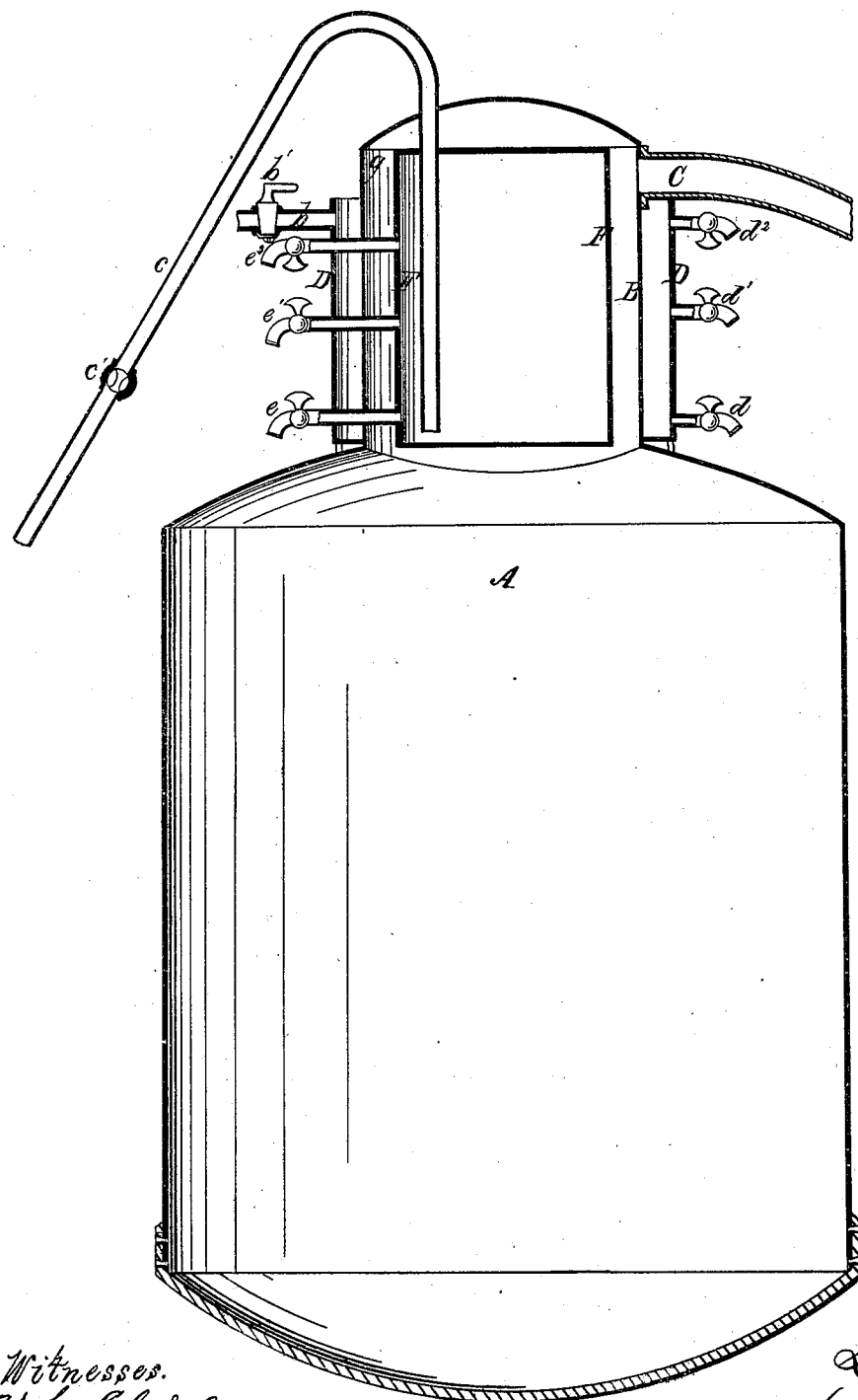

LEVI S. FALES, OF BOSTON, MASSACHUSETTS.

IMPROVED APPARATUS FOR THE DISTILLATION OF TAR AND OTHER SUBSTANCES.

Specification forming part of Letters Patent No. 52,151, dated January 23, 1866.

*To all whom it may concern:*

Be it known that I, LEVI S. FALES, of Boston, in the county of Suffolk and State of Massachusetts, have invented a new and useful Improvement in Apparatus for the Distillation of Tar and other Substances; and I do hereby declare that the following is a full, clear, and exact description of the same, reference being had to the accompanying drawing, forming part of this specification, said drawing representing a vertical section of a still with my improvement applied.

This invention has, generally speaking, for its object the extraction of oil of a uniform specific gravity of about 45°, suitable for illuminating purposes, from tar, paraffine, and the heavy residual oils which result from the distillation of petroleum or the redistillation of coal-oils. The boiling or evaporating temperature of these heavy oils and substances is so much higher than that above which the lighter oil, which I wish to obtain, will remain in a vaporiform state that, in their distillation, there will be evolved from them a large quantity of heavy vapors which must be prevented from passing over into the ordinary condenser with the vapor of the aforesaid lighter oil.

My invention relates to the application of a cooling medium at the outlet of the retort for the purpose of cooling the vapors at that point to a sufficient degree to cause the condensation and separation of the heavier portions and their return to the still, while the vapors of the lighter illuminating-oil are left free to pass on alone to the ordinary condenser, in which they are finally condensed.

I am aware that a cooling apparatus has been heretofore applied at or near that point; but so far as I am aware no means of regulating the action of such apparatus has been employed. Now, as in the progress of the distilling process the increasing density of the oil or other substance remaining in the retort requires an increasing heat to produce its evaporation, and by consequence the vapors rising from the retort have an increasing temperature, I find it necessary, in order to obtain that uniform density of the product which passes over to the condenser, where final condensation is effected, that there should also be an increased application of the cooling medium sufficient to maintain a uniform temperature of the cooling apparatus wherein the separation of the heavier and lighter vapors are effected.

My invention therefore consists in the employment, in connection with a cooling apparatus applied at the outlet of the retort, between it and the ordinary condenser, of means of so regulating the supply or action of water or other cooling medium by which the separation of the heavier from the lighter vapors is effected as to obtain the uniform density of the product of final condensation.

It further consists in the arrangement of the cooling-surfaces, through which the above-mentioned separation of the heavier and lighter products by the influence of cold water or air is obtained, around or within a dome or elevated chamber situated directly over and in such unobstructed communication with the retort or body of the still that it may constitute in effect a portion of the same, and provide for a free return of the condensed heavier products to the lower part of the still.

To enable others skilled in the art to apply my invention to use, I will proceed to describe it with reference to the drawings.

A is the retort or body of the still, of any usual or suitable form, heated by a fire below or by other suitable means. B is a dome or elevated chamber on the top of the retort or body A, and having the bottom entirely open thereto. To this dome or chamber is attached the goose-neck or outlet-pipe C, leading to the ordinary condenser. (Not shown.) This dome is surrounded by a jacket, D, which may be open or closed at the top, but is represented open. The said jacket has connected with it a pipe, $b$, furnished with a stop-cock, $b'$, for the admission of cold water from any suitable elevated reservoir. (Not shown.) Within the dome there is arranged a close vessel, F, which has connected with it a pipe, $c$, furnished with a stop-cock, $c'$, for the admission of cold water. The jacket D is furnished at different heights with faucets $d\ d'\ d^2$, for the escape of the water admitted by the pipe $b$. The vessel F is furnished at different heights with faucets $e\ e'\ e^2$, for the escape of the water admitted by the pipe $c$.

The operation is as follows: The still having been charged with the tar or other substance to be distilled is then heated till ebullition commences, the faucets $d\ d'\ d^2$ and $e\ e'\ e^2$ being all open. Cold water is then admitted to the jacket D and vessel F by opening the cocks $b'$ and $c'$, for the purpose of cooling the dome or elevated chamber B, and thereby producing the condensation of the heavier vapors and causing their condensed products to fall back into the retort, the water flowing through the said jacket and vessel and escaping by the lower faucets, $d$ and $e$. The vapors which pass from the dome by the outlet-pipe C, without being condensed are condensed by their passage through the ordinary condenser and collected in a suitable receiver, in which their condensed products are tested by the hydrometer, and if found to be of a specific gravity above 45° Baumé one or more of the faucets $d\ d'\ d^2$ and $e\ e'\ e^2$ are closed, commencing with the lowest, $d$ and $e$, to allow the water to rise to a greater height in the jacket D and vessel F, and increase the condensation in the dome or elevated chamber B, till the escaping condensed products have the desired specific gravity. As the distillation proceeds and the tar or other substance in the still becomes more dense, which will be detected by the diminution of quantity of the escaping condensed products or their diminished specific gravity, the heat applied to the retort is increased, and as this increased heat will cause the elimination of heavier vapors, the effective cooling-surfaces of the jacket D and vessel F will have to be increased from time to time by closing the faucets next above those previously closed, as it is necessary to maintain a nearly-uniform temperature in the dome or elevated chamber B in order to obtain a nearly-uniform density of the escaping condensed products.

Instead of increasing the effective cooling-surface in the dome or elevated chamber B, as above described, by causing the water to rise higher in the jacket D and vessel F, the increased cooling effect of the cold water flowing through the said jacket and vessel may be obtained by increasing the flow of water. This may be done by raising the head in the reservoir from which the said jacket and vessel are supplied. The flow of water may, however, be produced by means of a force-pump, instead of by the pressure of the column in the elevated reservoir, and in that case the jacket D should be closed at the top, and the increased flow of water may be obtained by increasing the speed of the pump.

If cold air be used as the cooling medium, the jacket D should be closed at the top, and the air forced through the said jacket and vessel F by a fan or other blowing apparatus, and the increased cooling effect obtained by increasing the speed of the said apparatus.

It may be mentioned that it may not be desirable in all cases to use both the jacket D and the internal cooling-vessel, F, as a sufficient cooling effect might be obtained by the use of either of those contrivances.

What I claim as my invention, and desire to secure by Letters Patent, is—

1. In connection with a cooling-chamber at or near the outlet of a retort, between it and the ordinary condenser, for the separation of the heavier from the lighter vapors eliminated in the distillation of tar and heavy oils and substances, the employment of means of regulating the supply or action of the cooling medium, substantially as herein described, whereby a uniform density of light oil is obtained.

2. Increasing the cooling effect as the heat of the still is increased, either by increasing the effective cooling-surface or increasing the flow of the cooling medium, substantially as herein described.

3. The arrangement of the cooling-surfaces around or within a dome or elevated chamber situated directly over the retort and in such unobstructed communication therewith as to form in effect a portion thereof, substantially as and for the purpose herein specified.

LEVI S. FALES.

Witnesses:
J. W. COOMBS,
A. LE CLERC.